Jan. 3, 1956      J. F. ALCOCK      2,729,119
VARIABLE SPEED POWER TRANSMISSION MECHANISMS
Filed Aug. 15, 1952
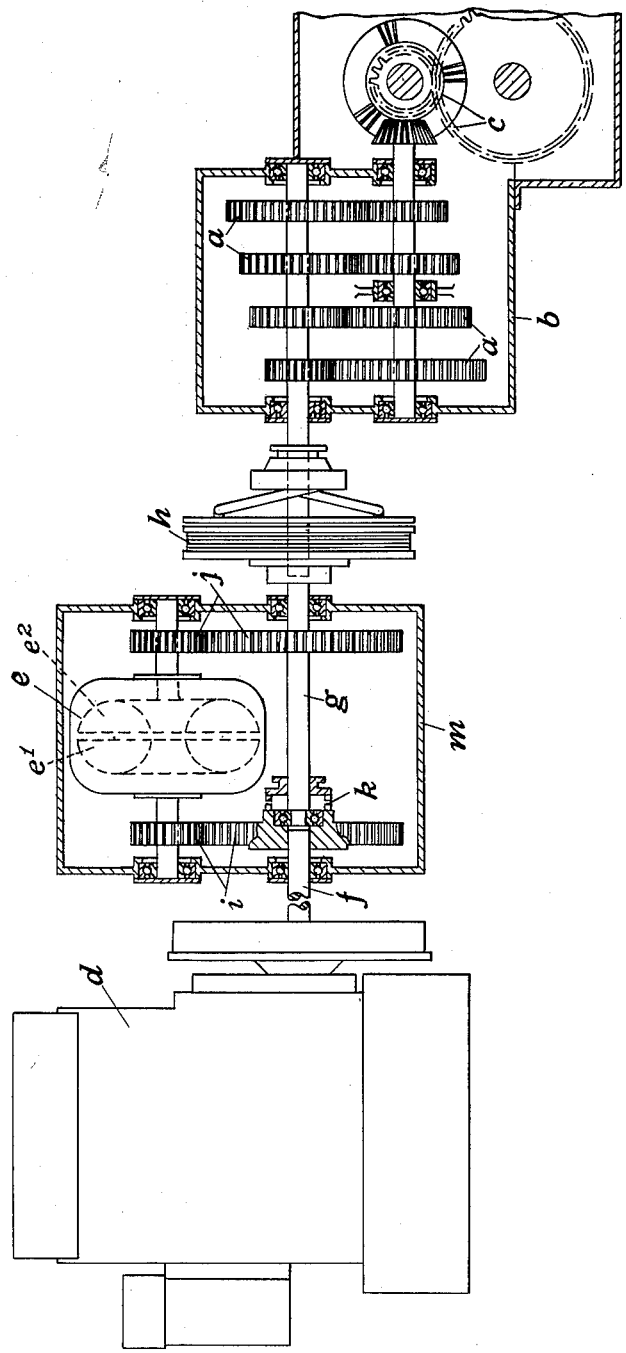
Inventor
J. F. Alcock

United States Patent Office 2,729,119
Patented Jan. 3, 1956

2,729,119

VARIABLE SPEED POWER TRANSMISSION MECHANISMS

John Frederick Alcock, Leeds, England

Application August 15, 1952, Serial No. 304,527

Claims priority, application Great Britain September 3, 1951

2 Claims. (Cl. 74—655)

This invention relates to variable speed power transmission mechanisms for use with diesel or like locomotive engines.

The object of the invention is to provide an improved combination of a variable speed toothed gearing and a hydraulic coupling or torque converter.

The invention comprises an arrangement in which the toothed gearing can at each step be connected to the engine either directly or through the hydraulic means.

In particular the invention comprises the combination of a two part power input shaft, a hydraulic means mounted in parallel with this shaft and having its input and output sides connected by gear wheels to the two parts of the said shaft, a clutch for interconnecting the adjacent ends of the said shaft, a variable speed toothed gearing, and a clutch for connecting one part of the said shaft to the said gearing.

The accompanying drawing illustrates diagrammatically one embodiment of the invention.

Referring to the drawing, there may be employed any conventional variable speed gearing $a$ contained in a housing $b$ and adapted to transmit motion to the rail wheels through gear wheels $c$. Between the gearing $a$ and the engine $d$ there is provided a hydraulic transmission means $e$ which may be in the form of a hydraulic coupling or a torque converter. The hydraulic means is of any convenient and conventional form comprising an input member $e^1$ and an output member $e^2$. The axis of the hydraulic means is mounted parallel with a power input shaft, comprising two parts $f$, $g$ the part $f$ of which is adapted for connection to the engine and the other part $g$ of which is connected to the gearing $a$ through a friction clutch $h$ of conventional form. Further the two shaft parts $f$, $g$ are respectively connected through gear wheels $i$, $j$ to the input and output sides of the hydraulic means $e$. Moreover the adjacent ends of the shaft parts $f$, $g$ are interconnectible by a clutch $k$ of any convenient form, such as, for example, a dog clutch.

In the example shown, the hydraulic means $e$ and associated shafts and gear wheels are contained in a housing $m$.

The arrangement is such that with the two parts $f$, $g$ of the input shaft connected together by the associated clutch $k$, the hydraulic means is rendered inoperative, both the input and output parts of the hydraulic means being then driven idly by the said shaft parts $f$, $g$. In this condition power is transmitted through the gear box $a$ only. But when the clutch $k$ is disengaged, the power is transmitted from the engine to the gearing $a$ through the hydraulic means. At each step in a change of speed the toothed gearing can be connected to the engine either directly or through the hydraulic means.

By this invention a wide range of control of the power transmitted from the engine is provided in a simple and convenient manner.

Having thus described my invention what I claim as new and desire to secure by Letters Patent is:

1. A variable speed drive for the traction wheels of a locomotive comprising a first gear box, a main power input shaft extending therein, an output shaft extending therein in alignment with said input shaft, a clutch means within the gear box for coupling the said shafts together, a gear wheel on each of said shafts, a hydraulic transmission means within the gear box having its axis parallel to said shafts and including an input shaft and a coaxially arranged output shaft, a gear wheel on each said last mentioned shafts in meshing engagement with the gear wheels on the power input shaft and the first mentioned output shaft, a second gear box, a variable speed gearing therein including an output shaft for driving the traction wheels and an input shaft, said last mentioned input shaft being coaxial with the output shaft of the first gear box, and a second clutch means for coupling the input shaft of the variable speed gearing with the output shaft of the first gear box whereby with the second clutch means engaged the selective engagement or disengagement of the first clutch means provides either a direct drive for all speed changes of the variable speed gearing or a drive therefor which includes the hydraulic transmission.

2. A variable speed drive for the traction wheels of a locomotive comprising a first gear box, a main power input shaft extending therein, an output shaft extending therein in alignment with said input shaft, a clutch means within the gear box for coupling the said shafts together, a gear wheel on each of said shafts, a hydraulic transmission means within the gear box having its axis parallel to said shafts and including an input shaft and a coaxially arranged output shaft, a gear wheel on each said last mentioned shafts in meshing engagement with the gear wheels on the power input shaft and the first mentioned output shaft, a second gear box, a variable speed gearing therein including an output shaft for driving the traction wheels and an input shaft, said last mentioned input shaft being coaxial with the output shaft of the first gear box, and a friction clutch means for coupling the input shaft of the variable speed gearing with the output shaft of the first gear box whereby with the friction clutch means engaged the selective engagement or disengagement of the first clutch means provides either a direct drive for all speed changes of the variable speed gearing or a drive therefor which includes the hydraulic transmission.

References Cited in the file of this patent

UNITED STATES PATENTS

| | | |
|---|---|---|
| 1,026,498 | Delaunay-Belleville | May 14, 1912 |
| 2,126,547 | Fottinger | Aug. 9, 1938 |
| 2,550,055 | Flinn | Apr. 24, 1951 |